United States Patent
Embarmannar Vijayan et al.

(10) Patent No.: US 10,924,329 B2
(45) Date of Patent: Feb. 16, 2021

(54) SELF-HEALING TELCO NETWORK FUNCTION VIRTUALIZATION CLOUD

(71) Applicant: VMWARE, INC., Palo Alto, CA (US)

(72) Inventors: Radhakrishna Embarmannar Vijayan, Bangalore (IN); Thatayya Naidu Venkata Polamarasetty, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/358,734

(22) Filed: Mar. 20, 2019

(65) Prior Publication Data

US 2020/0235986 A1    Jul. 23, 2020

(30) Foreign Application Priority Data

Jan. 18, 2019    (IN) .............................. 201941002229

(51) Int. Cl.
*H04L 12/24* (2006.01)
*H04L 12/26* (2006.01)
*G06F 9/455* (2018.01)

(52) U.S. Cl.
CPC .......... *H04L 41/0631* (2013.01); *G06F 9/455* (2013.01); *G06F 9/45541* (2013.01); *H04L 41/04* (2013.01); *H04L 41/065* (2013.01); *H04L 41/0654* (2013.01); *H04L 41/0677* (2013.01); *H04L 41/0686* (2013.01); *H04L 41/22* (2013.01); *H04L 43/045* (2013.01); *H04L 43/065* (2013.01); *H04L 43/0829* (2013.01); *H04L 43/12* (2013.01); *H04L 43/14* (2013.01); *H04L 43/16* (2013.01)

(58) Field of Classification Search
CPC .............................. G06F 9/455–45558; G06F 2009/45562–45595; G06F 11/0712; G06F 11/1484; G06F 11/301; G06F 2201/815; G06F 2212/15–154; H04L 41/02–5096; H04L 43/02–50
See application file for complete search history.

(56) References Cited

U.S. PATENT DOCUMENTS

| | | | |
|---|---|---|---|
| 8,738,972 B1 * | 5/2014 | Bakman | G06F 11/0712 |
| 2009/0144420 A1 | 6/2009 | Attanasio | |
| 2014/0165054 A1 * | 6/2014 | Wang | G06F 9/45558 |
| 2015/0082308 A1 | 3/2015 | Kiess | |
| 2017/0149604 A1 * | 5/2017 | Burford | H04L 41/0681 |
| 2018/0034966 A1 | 2/2018 | Te Booij | |
| 2019/0379728 A1 | 12/2019 | Hellstrom | |
| 2019/0394081 A1 * | 12/2019 | Tahhan | H04L 41/0654 |
| 2020/0067792 A1 | 2/2020 | Aktas | |
| 2020/0073780 A1 | 3/2020 | Morariu | |

* cited by examiner

*Primary Examiner* — Timothy J Weidner
(74) *Attorney, Agent, or Firm* — Clayton, McKay & Bailey, PC (57) ABSTRACT

Examples herein describe systems and methods for self-healing in a Telco network function virtualization cloud. KPI attributes for virtual network functions can be mapped to physical fault notifications to create synthesized alerts. The synthesized alerts can include information from both a virtual and physical layer, allowing a self-healing action framework to determine root causes of problems in the Telco cloud. Remedial actions can then be performed in either the virtual or physical layer of the Telco cloud. Remedial actions in one layer can be based on root causes identified in the other, which can allow for remediation before network downtime occurs.

20 Claims, 6 Drawing Sheets

SELF-HEALING TELCO NETWORK FUNCTION VIRTUALIZATION CLOUD

RELATED APPLICATIONS

Benefit is claimed under 35 U.S.C. 119(a)-(d) to Foreign Application Serial No. 201941002229 filed in India entitled "SELF-HEALING TELCO NETWORK FUNCTION VIRTUALIZATION CLOUD", on Jan. 18, 2019, by VMWARE, Inc., which is herein incorporated in its entirety by reference for all purposes.

The present application is related in subject matter to U.S. patent application Ser. No. 16/358,729, which is incorporated herein by reference.

BACKGROUND

Enterprises of all types rely heavily on networked clouds and datacenters to provide content to employees and customers alike. Preventing downtime has always been a primary goal, and network administrators are armed with various tools for monitoring network health. However, the virtualization of network infrastructure within datacenters has made it increasingly difficult to anticipate problems. It is estimated that 59% of Fortune 500 companies experience at least 1.6 hours of downtime per week, resulting in huge financial losses over the course of a year. Existing network monitoring tools do not effectively predict problems or service degradation based on key performance indicators ("KPIs"). As a result, failures occur before the underlying causes are remediated.

Some information technology ("IT") operational tools provide analytics and loop-back policies for analyzing virtual infrastructure. However, these generally analyze the overlay of the virtual infrastructure, meaning a virtual layer of abstraction that runs on top of the physical network. These do not account for the interactions between physical networking structures and virtual ones, such as software-defined networks ("SDNs"), virtual network functions ("VNFs"), and other aspects of network function virtualization ("NFV"). In general, the relationships between a physical underlay and virtual overlay are not adequately used to predictively prevent problems.

Data center infrastructure is shifting heavily towards NFV implementation and software-defined datacenters. The Telco cloud is a virtualized telecom infrastructure that runs cloud services at distributed locations, essentially expanding networking into the cloud. Using NFV in the Telco cloud, network providers are able to deliver new capabilities and configurations quickly for various business and competitive advantages. This virtualization has led to more data availability than ever before, with even more promised based on widespread 5G technology adoption. However, widespread data availability will only increase the need to rapidly detect and prevent network downtime. In addition, traditional methods of detecting network failures based on connectivity issues may be even less effective in the NFV space.

As a result, a need exists for self-healing Telco NFV clouds.

SUMMARY

Examples described herein include systems and methods for self-healing a Telco NFV cloud. An example method can include receiving, at an evaluator engine, KPI information relating to a VNF of a Telco cloud. The KPI information can be part of an alert sent from a virtual analytics engine that monitors a virtual layer of the Telco cloud. The virtual analytics engine can generate KPI-based alerts by comparing attributes of VNF performance against KPI thresholds. The evaluator engine can also receive a physical fault notification that includes hardware information about a physical device in the Telco cloud. The physical fault notification can be sent from a physical analytics engine that monitors for physical hardware faults at devices in a hardware layer of the Telco cloud.

The system can map the hardware information to the KPI information as part of a root cause analysis. In one example, the mapping is based on determining that the VNF operates on the physical device identified in the physical fault information. KPI information can be identified from the VNF, in an example, and mapped to hardware information.

In one example, the system can use the KPI information and hardware information to perform a remedial action in the Telco cloud. The remedial action can be based on a root cause event created from the mapping step and can remediate problems in the physical or virtual layer of the Telco cloud, depending on the root cause. This can allow a root cause originating in the virtual layer to be used to remediate a physical layer issue. Alternatively, a root cause originating with hardware in the physical layer can be used to remediate one or more virtual components (e.g., VNFs) in the virtual layer.

In one example, the mapping involves sending alerts from one layer to the other through an injection process facilitated by components of the evaluator engine. In one example, the virtual analytics engine generates an alert based on a KPI threshold comparison and sends the alert to the physical analytics engine. This can include converting the alert object into another object type that is useable by the physical analytics engine. A virtual threshold injector of the evaluator engine can allow the physical analytics engine to utilize KPI threshold comparisons to diagnose the root cause of problems. In one example, the system determines that a problem exists based on comparing a KPI attribute from the alert to a symptom threshold. A virtual threshold model can define symptoms based on KPI thresholds, then define problems based on symptoms.

When a problem is recognized, the physical analytics engine can correlate the alert from the virtual analytics engine to a physical hardware device. This can include using a model that maps physical devices to VNFs. Hardware information can be synthesized with the KPI information to create a root cause analysis event. The root cause analysis event can include information about the physical hardware device and KPI attribute.

The root cause analysis event can be used by a self-healing component to identify a remedial action. This can include presenting a notification on a graphical user interface ("GUI") or automating a change in the Telco cloud. The change in the Telco cloud can occur in either the physical or virtual layer. For example, the self-healing component can send a request to an orchestrator to change a virtual component, such as reconfiguring a VNF or instantiating it at different port or host. Alternatively, when the physical hardware device is the root cause of the problem, the self-healing component can cause a management process to apply a different configuration to the hardware, such as a previously-stable configuration.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

In one example, a self-healing engine can help prevent datacenter problems and automate solutions in a Telco cloud environment. The self-healing engine can be a framework or topology that runs on a physical server. The self-healing engine can map virtual machine ("VM") activity to physical hardware activity based on information received from a virtual analytics engine and a physical analytics engine. The virtual analytics engine, also referred to as a VM overlay or virtual overlay, can monitor and report key performance indicators ("KPIs") of the VMs in the Telco cloud. An example virtual analytics engine is VMware®'s vRealize®. The physical analytics engine, also referred to as a hardware analytics engine or HW overlay, can perform service assurance of physical devices such as hardware servers and routers. This can include reporting causal analysis, such as packet loss, relating to the physical hardware of the Telco cloud. In one example, the self-healing engine operates together with the virtual and hardware engines, and together can consist of one or more applications executing on one or more physical devices.

The self-healing engine can map the physical and virtual components so that the KPI analytics and causal analytics can be evaluated together as part of root cause analysis ("RCA"). The mapping can be done based on alerts received from both the virtual and hardware engines, which can identify particular physical and virtual components. In one example, the virtual and hardware engines can send alerts to each other, allowing the two engines to adjust which notifications get sent to the self-healing engine. The self-healing engine can predict whether a software or hardware problem exists by comparing the mapped virtual and physical information to action policies. The action policies can specify prediction criteria and remedial actions, such as alerts to notify an admin or scripts for automatic remediations. As examples, a service operations interface can provide an administrator with an alert regarding a physical problem. In another example, the system can instantiate a new VNF host to replace another that is failing.

In one example, a self-learning algorithm can adjust the prediction criteria, detect VM or hardware information changes based on the remediation, and adjust the prediction criteria accordingly. For example, the self-healing engine can cause dynamic thresholds for KPI analytics to adjust to change the predictive sensitivity. This can include adjusting thresholds used by the physical analytics engine (for example, for hardware service assurance) based in part on KPI analytics from the VM overlay. Likewise, the virtual analytics engine can adjust its thresholds for reporting KPI analytics based on notifications from the physical analytics engine. As Telco cloud datacenters increase in complexity, using analytics from the virtual and physical layers to detect potential issues in the other layer can help remediate issues before catastrophic failures occur, unlike current systems.

Figure 1A:
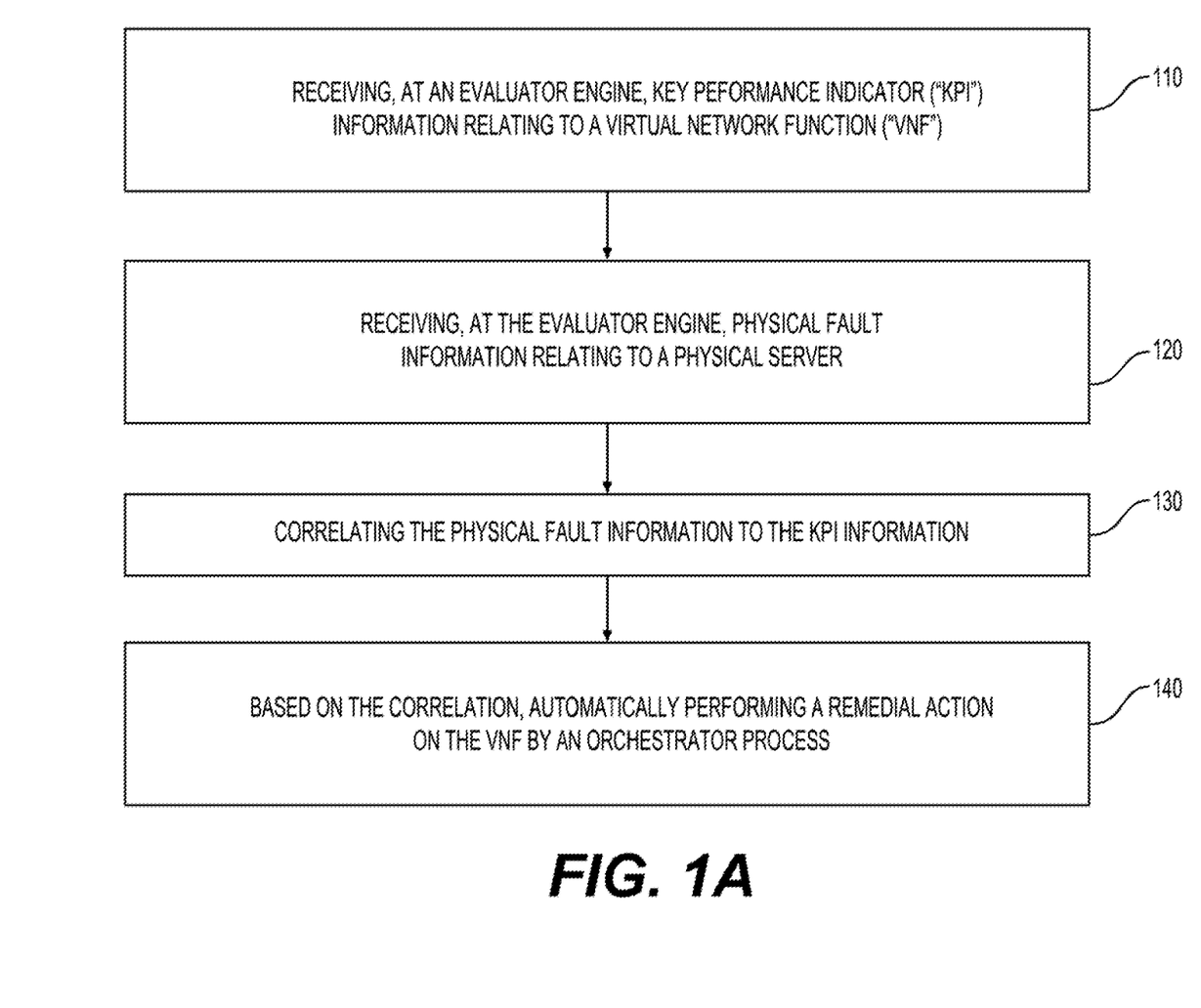
FIG. 1A is a flowchart of an example method for performing self-healing of a Telco network function virtualization cloud.

FIG. 1A is an example flowchart of steps performed by a system for self-healing a Telco NFV cloud. The Telco cloud can be one type of distributed network, in which network functions are located at different geographic locations. These locations can be different clouds, such as an edge cloud near a user device and core clouds where various analytics engines can execute. At stage 110, an evaluator engine can receive KPI information relating to a VNF. The evaluator engine can be an application or VM executing on a server. The evaluator engine can be part of the virtual analytics engine and the physical analytics engine. These also can be applications or VMs executing on a physical device, such as a server. Alternatively, the evaluator engine can operate separately and remotely from the virtual or physical analytics engine.

In one example, the evaluator engine receives the KPI information from a virtual analytics engine. The virtual analytics engine can act as a virtual overlay that provides analysis and management features for a virtual datacenter, such as a datacenter that uses VMs on a Telco cloud. One such virtual overlay is VMware®'s vRealize®. The virtual analytics engine can provide dynamic thresholding of KPI information including a historical time series database for analytics. The virtual analytics engine can provide alerts when KPI thresholds are breached. The alerts can be configured and based on policy files, which can be XML definitions.

The virtual analytics engine therefore manages information coming from a virtual layer of a network. Traditionally this has involved very limited connectivity with physical devices by an enterprise network, rather than the massive connectivity of a Telco cloud. Although virtual analytics engines primarily have had enterprise customer bases to this point, examples herein allow for using virtual analytics engines with a customer base that manages distributed networks, such as a Telco cloud.

The KPI information can include performance information of a virtual component, such as a VM. The VM can be a virtual networking component, such as a virtual switch or router. Such virtual networking components are also referred to as VNFs. The KPI information can indicate one or more of packet drops, input packet rate, output packet rate, read latency, write latency, throughput, number of operations, and others. In one example, the KPI information is sent to the evaluator engine when the virtual analytics engine determines that particular measured metrics exceed a performance threshold, fall below a performance threshold, or are otherwise anomalous. For example, if a number of packet drops exceeds a threshold during a time period, then the virtual analytics engine can send corresponding KPI information to the evaluator engine. The KPI information can be sent in a JSON or XML file format.

At stage 120, the evaluator engine can receive physical fault notification relating to a physical component, such as a hardware server or router. A physical analytics engine can determine and send the physical fault notification to the evaluator engine. The physical fault information can be a notification or warning, in one example. For example, the physical analytics engine can monitor for hardware temperature, a port becoming non-responsive, packet loss, and other physical faults. Physical faults can require operator intervention when the associated hardware is completely down.

The physical analytics engine can perform causal analysis (for example, cause and effect) based on information from the physical layer. This can include a symptom and problem analysis that includes codebook correlation for interpreting codes from hardware components. One such physical analytics engine is Service Assurance®. Prior to the example described herein, hardware analytics engines such as Service Assurance® have been used with a Telco customer base but not for enterprise applications. In one example, physical fault notifications can be generated based on a model of relationships, including a map of domain managers in the network. The physical analytics engine can manage information coming from the physical underlay in the Telco cloud. Various domain managers can discover the networking domain in a datacenter. Models generated by the virtual analytics engine can be used to provide cross-domain correlation between the virtual and physical layers, as will be described.

At stage 130, the system can correlate the physical fault information to the KPI information. In one example, this is done by sending alerts from the physical analytics engine to the virtual analytics engine, and vice versa. Each engine can then adjust its own respective alerts based on the other engine's alerts. The KPI information can indicate one or more VMs and the physical fault information can indicate particular hardware components or ports of those hardware components.

The system can use a topology of mapping services to associate the particular virtual components to hardware components. The topology can allow the engines to more accurately correlate the KPI information and the physical fault information, in an example. The topology can continually and dynamically evolve based on a data collector framework and discovery process that creates the topology based on what is running in the Telco cloud. The discovery process can account for both physical and virtual components.

Discovery of physical components can include identifying the physical servers, routers, and associated ports that are part of the Telco cloud. The discovery process can be periodic or continuous. In one example, the physical analytics engine, such as Service Assurance®, performs the hardware discovery and creates a physical model to track which hardware is part of the Telco cloud. This can include identifying hardware, such as Cisco® hardware, along with certifications pertaining to that hardware. This information can be reported to the physical analytics engine. The physical model can further include identification of bridges, local area networks, and other information describing or linking the physical components.

Discovery of virtual components can include identifying VNFs that operate as part of the Telco cloud. The VNFs can represent virtual controllers, virtual routers, virtual interfaces, virtual local area networks ("VLANs"), host VMs, or other virtualized network functions. In one example, the virtual analytics engine can discover virtual components while the physical analytics engine monitors discovered hardware components. The hardware components can report which VNFs they are running, in one example. By discovering both the hardware and virtual components, the system can map these together.

A self-healing component of the evaluator engine can then take remedial actions at stage 140 based on the correlation. In one example, the self-healing component determines a remedial action based on an action policy file. The action policy file can map alerts, object types, and remedial actions to be taken. The action policy file can be an XML file, JSON file, or a different file format. The self-healing engine can utilize a single action policy file that defines multiple different remedial actions, in one example. Alternatively, the self-healing engine can utilize multiple different action policy files, each one containing one or more remedial actions. An action policy file can address how to respond to a particular type of information.

The self-healing component can receive information from both the virtual analytics engine (for example, vRealize®) and the physical analytics engine (for example, Service Assurance®). In one example, the virtual analytics engine can issue a first alert when a KPI threshold is exceeded, and the physical analytics engine can issue a second alert when a port is down.

In one example, the KPI information or physical fault information is represented by an alert object, also referred to as a root cause analysis event. The self-healing component can use information in the alert object to look up corresponding remedial actions in the action policy file. For example, an alert object can include information about the source of the alert, the type of alert, and the severity of the alert. Some or all of this information can be used to determine the appropriate remedial action.

In one example, an alert object can contain identifying information regarding the component to which the alert relates. For a virtual component, the identifying information can include a unique string that corresponds to a particular VNF. For a hardware component, the object can identify a rack, shelf, card, and port. The action policy file can specify different actions based on the identifying information. For example, if a particular VNF is implicated, the self-healing component can send a new blueprint to an orchestrator associated with that VNF, resulting in automatic deployment of the VNF to other physical hardware that is not experiencing a physical fault. An orchestrator can be a service that is responsible for managing VNFs, including the identified VNF, in an example.

In one example, the self-healing component can also use the object type of the alert to make similar decisions. For example, physical fault information can have a different file type than KPI information. In one example, the self-healing component can apply different action policy files based on the different file types.

As an example, the policy action file can include multiple actions, including those in Table 1, below.

TABLE 1

| Object Name | Object ID | Severity | Description | Action Type |
|---|---|---|---|---|
| Card | Card-1-1-2-3 | Critical | Temperature above thresholds | Physical HW |
| Port | Port-1-1-2-3-1 | Critical | Error packets beyond threshold | Physical SW |
| Card | Card-1-1-2-3 | Critical | Packet drop rate above threshold | Physical SW |
| VNF | VNF-HostID-as23ds | Critical | Service degradation | Virtual SW |

TABLE 1-continued

| Object Name | Object ID | Severity | Description | Action Type |
|---|---|---|---|---|
| Host | HostID-as23ds | Critical | beyond threshold Host down | Physical HW |

As shown in the Object Name column of Table 1, alert objects can correspond to physical cards, such as servers, routers, or other physical devices. The alert object can specify the physical device itself or a port that is operating at the physical device. The alert object can also implicate a VNF, or a host on which virtual components operate.

The Object ID column can identify the specific virtual or hardware component. For example, the Object ID for the first card indicates rack 1, shelf 1, card 2, port 3. The Port entry is similar but adds a suffix of 1. Likewise, the VNF of the fourth row is identified as VNF-HostID-as23ds. However, the naming conventions can be different, and these are only examples.

The Action Type can indicate the layer in which the action will be performed, and whether the action requires hardware ("HW") or software ("SW") remediation. For example, when a card alert indicates that the temperature is above a threshold, the action is needed in the physical layer and requires hardware remediation. This can include alerting an operator so that they can act. When a port alert indicates error packets are above a threshold, the remediation can be a software change in the physical layer. For example, a different configuration file can be deployed to the hardware responsible for the port alerts. For the VNF alert in this example, the root cause can be in the virtual layer and require software remediation, such as instantiating a new VNF. However, both the physical layer and virtual layer alerts can require remediation in their own layer or in the other, depending on the combination of problems and machine learning by the evaluator engine. The severity and description can be used to determine the remedial action to perform. In this example, only critical alerts result in remedial actions. But in other examples, lower level alerts, such as moderate alerts, could also result in remedial actions.

When an alert meets one of the rows of the action policy file, that row can be used as an input to an action adaptor in one example. The action adaptor can then format one or more requests (also called commands) for performing a remedial action.

The action adaptor can also specify a destination where the request will be sent. The destination can be an orchestrator with management capabilities for a VNF, a network configuration manager ("NCM") that manages physical hardware, or some other process capable of receiving requests. The action adaptors can translate the action into a compatible request (for example, a command) at the destination. In an alternate example, the destination can be specified in the action policy file in one example.

As one remediation example, the adaptor can specify a network configuration job based on a remedial action defined in the action policy file. The network configuration job can be created in a format compatible with the NCM that operates with the physical hardware. In one example, the NCM is part of the physical analytics engine. For example, the adaptor can format a network configuration job for implementation by Service Assurance® or another NCM. Performing the remedial action in this way can cause the NCM to schedule a job for performance. For remedial actions in the physical layer, example jobs can include sending a configuration file to the physical device, sending an operating system ("OS") upgrade to the physical device, restarting the physical device, or changing a port configuration on the physical device.

The adaptor can also translate actions in the policy action file into commands for an orchestrator associated with a VNF. An example orchestrator is Cloudify®. For example, the adaptor can generate one or more commands that cause the orchestrator to invoke a new virtual infrastructure configuration action. These commands can include sending a new blueprint to the orchestrator. A blueprint can indicate which VNFs should be instantiated on which physical devices. For remedial actions in the virtual layer, additional example commands can invoke a load balancing change or an instantiation of a VM.

In one example, the self-healing component can utilize multiple adaptors. For example, the physical layer and virtual layers can each have their own adaptors. If the action policy file indicates an Action Type that is Physical, a first adaptor can be used. If the action policy file indicates an Action Type is Virtual, a second adaptor can be used. In one example, information such as that in Table 1 can be sent to the adaptor for translation into the appropriate commands to the appropriate destination.

For example, the first adaptor can receive "Port, Port 1-1-2-3-1, Critical, 'Error packets beyond threshold', Physical SW." The first adaptor can translate this into a request (for example, a command) to send to a particular NCM, which can make a software change to potentially avoid a hardware problem. The self-healing component can send the request to the NCM in a format that allows the NCM to schedule a job to remedy the error packets issue. This can include pushing a configuration file to the physical hardware, in one example. It can also include updating an OS version.

As another example, the second adaptor can receive "VNF, VNF-HostID-as23ds, Critical, 'Service degradation beyond threshold,' Virtual SW." The adaptor can send a remediation request (for example, a command) to a process with managerial control over the VNF. The process can be an orchestrator, such as Cloudify®, or virtual analytics engine. Upon receiving the request, the process can make a load balancing move, in an example. In one example, the orchestrator can implement a blueprint that specifies a virtual infrastructure, resulting in a VNF being deployed, for example, at a different host or using a different port. The blueprint can be created in response from the command in one example. Alternatively, the self-healing component can provide a blueprint or portion of the blueprint to the orchestrator or virtual analytics engine.

Figure 1B:
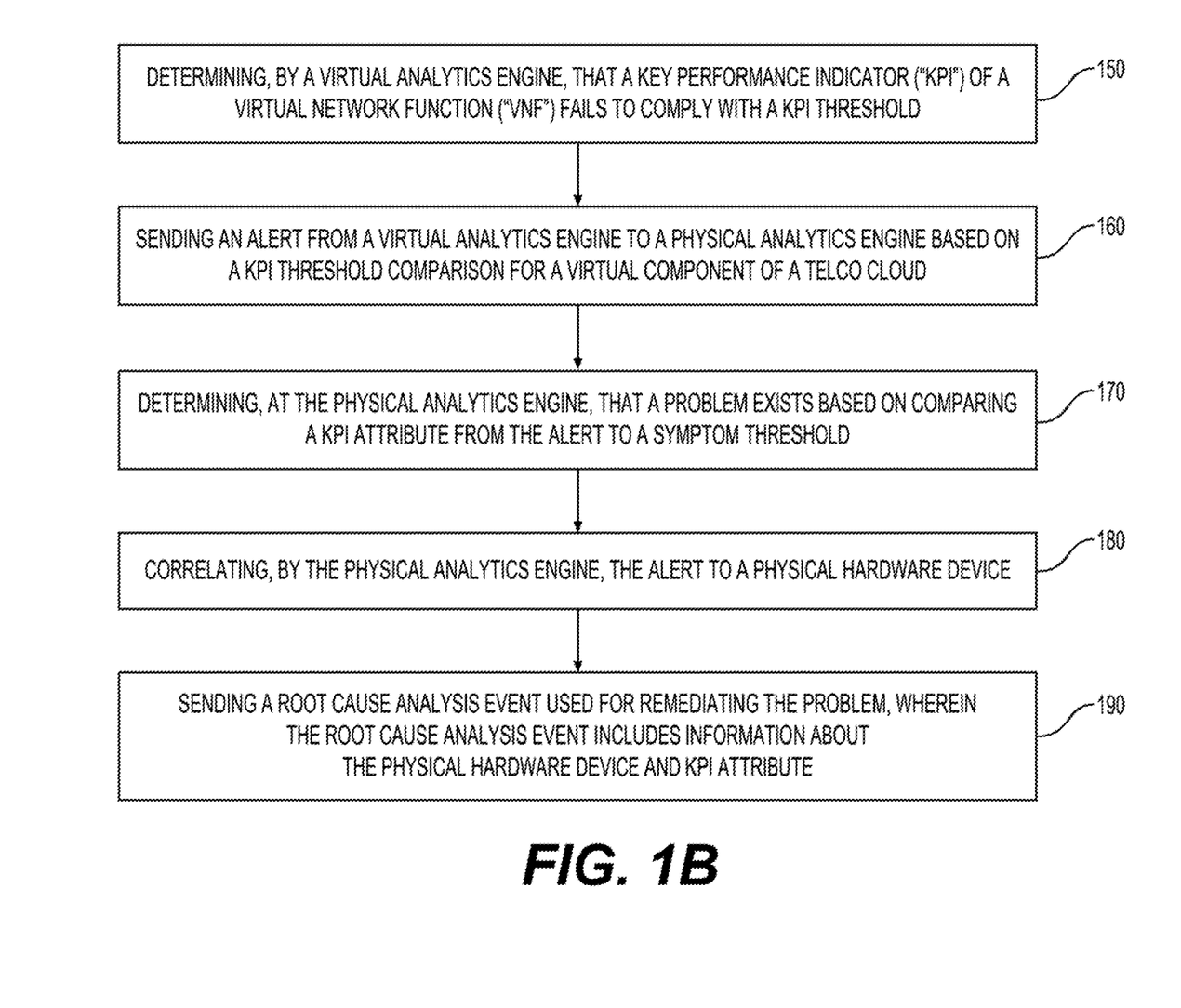
FIG. 1B is a flowchart of an example method for cross-layer threshold adjustment in a Telco cloud.

FIG. 1B is a flowchart of an example method for cross-layer threshold adjustment in a Telco cloud. In one example, events in the virtual layer can impact alerts in the physical layer. Likewise, events in the physical layer can impact alerts in the virtual layer. In one example, virtual thresholds can be injected into the physical layer from the virtual analytics engine. Additionally, physical faults can be injected into the virtual layer from the physical analytics engine. This can cause the virtual analytics engine to issue alerts to the evaluator engine based on physical faults, and the physical analytics engine to issue alerts to the evaluator engine based on KPI thresholds.

At stage 150, the virtual analytics engine can determine that KPI information fails to comply with a threshold. As discussed previously, this can occur when a metric is either below a threshold, above a threshold, or otherwise determined to be anomalous, depending on the example. At stage 160, the virtual analytics engine can then send a VNF alert to the physical analytics engine. The VNF alert can indicate that the KPI of a particular VNF does not meet the threshold applied at the virtual analytics engine.

At stage 170, the VNF alert can be compared against a virtual threshold. The virtual threshold can be injected into the physical analytics engine in one example. This can allow the physical analytics engine to predict hardware problems based on software KPI issues. In one example, the VNF alert is translated into an object that can be used at the physical analytics engine with the virtual threshold model. For example, a Kafka adapter can consume the VNF alert from the virtual analytics engine and a Kafka consumer can modify the VNF alert object into an object readable by the physical analytics engine.

In another example discussed in more detail later, the communication between virtual and physical layers can work in reverse. The physical analytics engine can detect a hardware problem, and a physical fault notification can be injected into the virtual analytics engine. This can cause the virtual analytics engine to perform the virtual threshold comparison. In either example, the evaluator engine can combine analysis from both layers to determine where the root cause of the problem originates.

Continuing with FIG. 1B, in one example, the virtual threshold model can define one or more thresholds for use in a KPI comparison. The virtual threshold model can include KPI attributes, symptoms base on KPI attribute comparisons to thresholds, and problems based on symptoms. An example virtual threshold model can be defined as follows:

model VirtualPerformanceThreshold{
    attribute isPacketThresholdExceeded;
    attribute packetDrop;
    attribute packetRate;
    attribute outputPacketRate;
    SYMPTOM PacketThresholdBreach isPacketThresholdExceeded;
    SYMPTOM ErrorPacket (packetDrop >70);
    SYMPTOM InputPacketRate (packetRate <50);
    SYMPTOM OutputPacketRate (packetRate <50);
    PROBLEM (PacketThresholdBreach && ErrorPacket && InputPacketRate && OutputPacketRate)}

In this example, the virtual threshold model includes KPI attributes such as whether a packet maximum is exceeded, a number of packet drops, an input packet rate, and an output packet rate. The symptoms define how these KPI attributes are compared against virtual thresholds. The first symptom in this example is whether the packet maximum is exceeded. This symptom can be an anomaly represented by a Boolean expression. The next three symptoms include comparing the number of packet drops to a threshold of 70 and comparing packet rates to a threshold of 50. This virtual threshold mode defines a problem as existing when any of the symptoms are true.

When a problem exists, at stage 180 the physical analytics engine can determine which physical hardware device corresponds to the VNF alert. This can include mapping the VNF to the hardware device based on a physical model. The physical model can include one or more mapping files between virtual and physical components and can utilize cross domain correlation between an IP listing of layer 3 physical devices (for example, switches, routers, and servers) and an enterprise service manager ("ESM") identification of virtual components, such as VNFs.

Using this correlation, at stage 190, the evaluator engine can create a root cause analysis ("RCA") event used for performing a remedial action. The RCA event can be a hardware alert that is sent to the self-healing component. The RCA event can come from the physical or virtual analytics engine and identify at least one virtual component (for example, VNF) whose KPI attributes were used in detecting the problem along with the correlating physical hardware device. In one example, the self-healing component can then check the RCA event against an action policy file, as previously described with regard to stage 140. The remedial action can be any of those discussed herein.

In another example, the RCA event of stage 190 can cause a console to alert an operator as part of remediation. For example, the RCA event can be sent to a service assurance manager process that runs an operations console. An alarm or notification can allow an administrator to check on the physical hardware device and correct a physical hardware issue before a major failure occurs.

Figure 2:
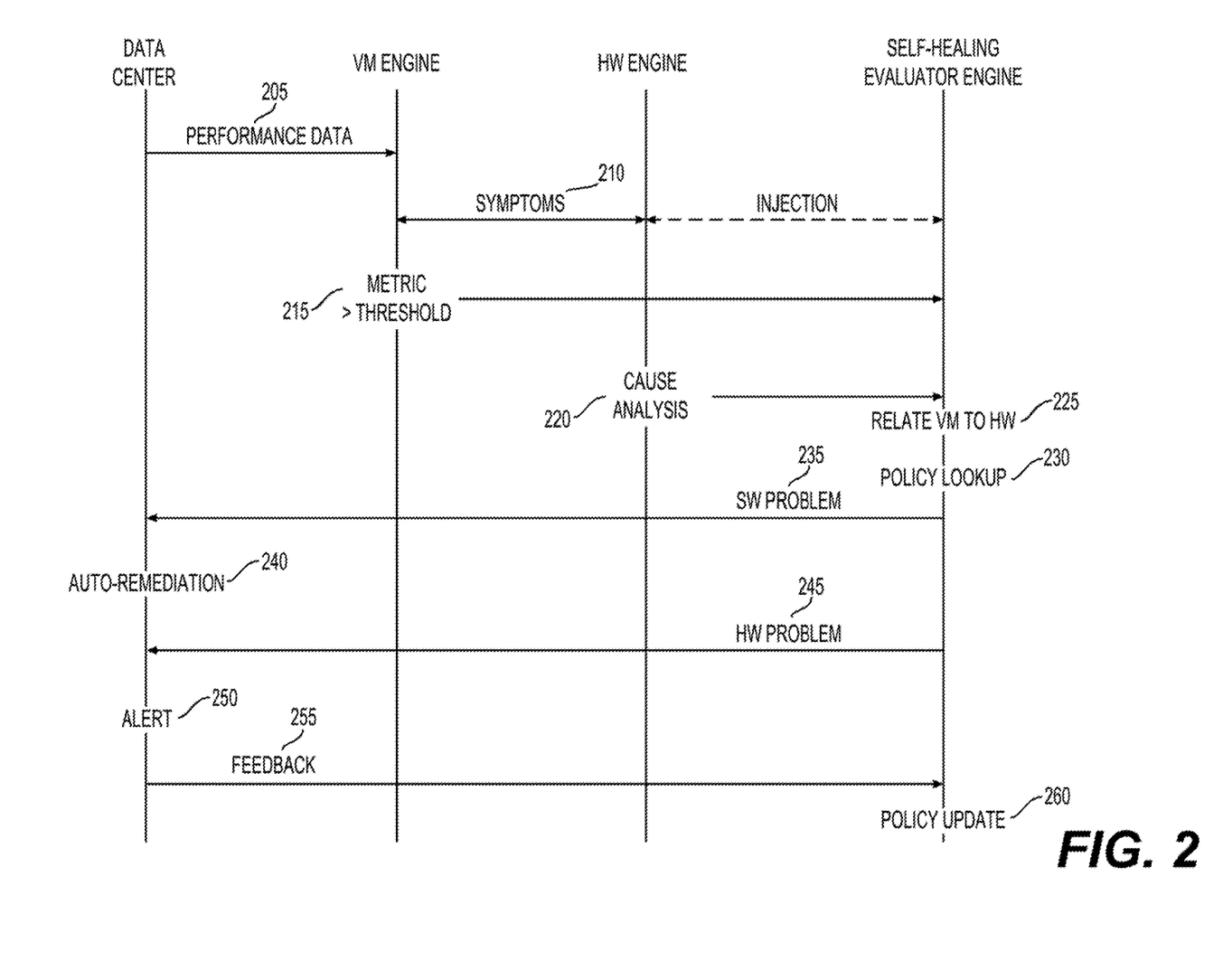
FIG. 2 is a sequence diagram of example steps for self-healing of a Telco network function virtualization cloud.

FIG. 2 is an example sequence diagram showing stages for self-healing a Telco cloud. At stage 205, the virtual analytics engine ("VM engine") and physical analytics engine ("HW engine") each analyze performance data of the datacenter, which can be virtualized across a Telco cloud. For the VM engine, this can include analyzing KPI information from VNFs that are tracked by the datacenter and part of the Telco cloud. Although stage 205 illustrates the performance data of the datacenter being sent to the VM engine, relevant performance data can also be sent to the HW engine at this stage. The HW engine can receive physical fault information from the hardware components of the Telco cloud that are tracked by the datacenter, such as physical routers, servers, and switches.

At stage 210, the VM engine and HW engine can send information to each other based on their own threshold comparisons. The VM engine can send KPI information and the HW engine can send physical fault notifications. This can allow the HW engine to consider KPI alerts from the virtual layer in diagnosing problems with physical hardware devices and allow the VM engine to consider alerts from the physical layer when diagnosing problems with virtual components, such as VNFs.

In one example, the VM engine sends symptoms to the HW engine at stage 210. This can also be referred to as threshold injection because the symptoms themselves can include threshold comparisons. In one example, KPI information collected at the VM engine can be compared against thresholds to discover symptoms of potential hardware issues. Likewise, the HW engine can send symptoms of hardware issues to the VM engine in an example. This can be referred to as physical fault injection because the HW symptoms can be based on physical faults, yet also be used as predictive symptoms for failures in the virtual layer that can occur based on the underlying hardware issues.

The evaluator engine can facilitate the exchange of symptoms between the VM and HW engines. In particular, the evaluator engine can provide injection from one engine to the other. This can include translating object types between the VM and HW engines, and additional logic for utilizing the virtual threshold at the HW engine and the fault injection at the VM engine. Therefore, aspects of stages 215 and 220 can be performed based on the injection provided by the evaluator engine, in an example. As will be discussed, this can allow the evaluator engine to create the RCA event by synthesizing an alert that contains information from both engines.

At stage 215, the VM engine can compare various metrics against thresholds to determine whether to send an alert to the evaluator engine. This can include analyzing KPI metrics in combination with fault metrics injected from the HW engine, such as whether temperature is out of bounds, a host has gone down, or a port is nonresponsive. When the threshold comparison specifies, the VM engine can send a VNF alert to the evaluator engine based on the outcome of the comparison.

At stage 220, the HW engine can perform causal analysis to determine whether a condition exists with hardware in the physical layer. This can include analyzing symptoms injected from the VM engine, such as analyzing packet drops, maximum packet thresholds, or packet rates. It can also include using Codebook Correlation Technology™ ("CCT") to diagnose hardware problems by combining behavioral models of various classes of datacenter elements with the discovered topology map of the infrastructure. The behavioral models can include local symptoms (for example, those displayed by a physical device) and propagated symptoms (for example, those from other physical devices in the surrounding topology). CCT can use an algorithm to compute problem signatures based on the local and propagated symptoms. The resulting problem signatures can be stored as mappings in a CCT codebook for real-time identification of physical faults and other problems. If a problem exists, the HW engine can send an alert to the evaluator engine.

The evaluator engine can receive one or more alerts from the HW engine and VM engine. At stage 225, the evaluator engine can correlate these alerts to either hardware or software problems. The correlation can be based on the models at the HW engine, which can link VMs to hardware devices. The RCA event can contain information from both the hardware and virtual layers based on this correlation.

In one example, a self-healing component can use information in the alert (for example, an RCA event) to determine whether a corresponding remedial action should take place in the physical or virtual layer of the datacenter. For example, at stage 230 the self-healing component can compare information from the alert to an action policy, such as the example discussed with regard to Table 1 above. An alert coming from the HW engine can require either hardware or software remediation. The same is true of alerts coming from the VM engine. The action type identified in the action policy and can indicate whether hardware or software remediation is appropriate.

Based on the type of remediation required, the evaluator engine or self-healing component can employ a corresponding adaptor to issue a command to the right process within the datacenter ecosystem. For example, to remediate a software problem in the physical layer, at stage 245 an adaptor can send a command to a network configuration manager to restore a host to a previous stable state using a configuration file. Alternatively, a hardware problem can be remediated in the virtual layer by using a different adaptor. For example, the adaptor can send a command to an orchestrator at stage 235 to deploy at a VNF at a new location, such as at a location where a port is not down.

In these examples, the term "command" also means a "request." The command can be an application programming interface ("API") call made by the adaptor to the destination. For example, the adaptor at stage 235 can be preconfigured to communicate with the orchestrator using API functions exposed by that orchestrator. Similarly, the adaptor communicating with the network configuration manager can use API functions available at the network configuration manager.

In one example, remediation in the physical layer can include providing an alert to an administrator or operator at stage 250. The alert can be presented in a graphical user interface ("GUI"), such as a GUI available at a service assurance manager process. The alert can notify the administrator that a physical host is down, that a physical device is non-responsive, or other problems that may require human intervention.

Additionally, a datacenter element can provide feedback at stage 255 that impacts the remediation activities of the evaluator engine. This can be administrator feedback manually submitted, such as through a GUI. Alternatively, the feedback can also be automatically provided by elements of the datacenter, even including the VM and HW engine. In one example, the administrator can elect to adjust the sensitivity of the self-healing component to cross-layer problems. This can change the severity level required in the action policy before a remedial action is performed. In another example, if a VM such as a VNF fails, the VM engine can recognize the failure and provide a feedback message to the self-healing component to increase the sensitivity by lowering severity required for a remedial action. This type of feedback can further train the evaluator engine to catch problems before failures occur, in an example.

Figure 3:
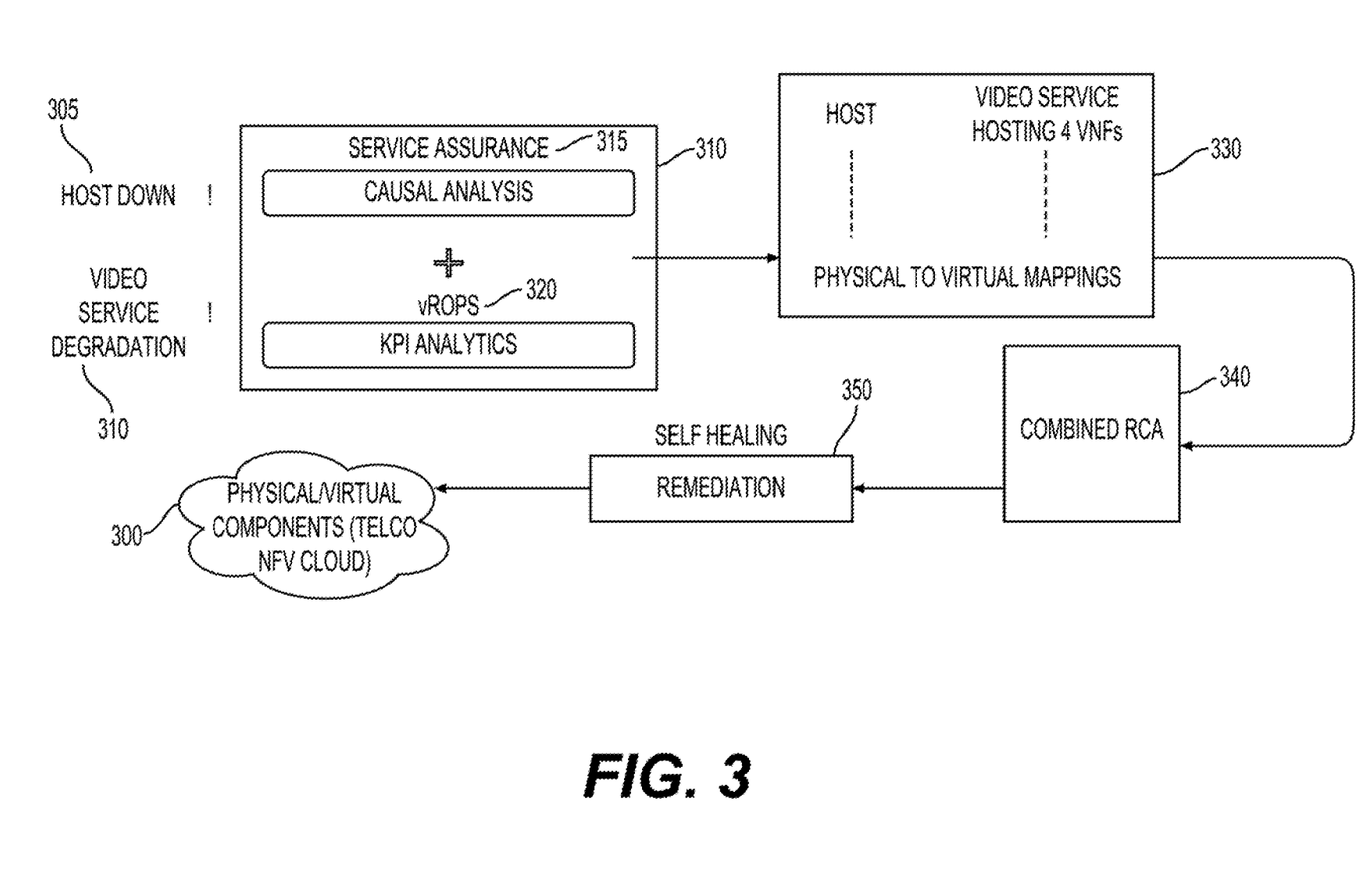
FIG. 3 is an example system diagram including components for self-healing of a Telco network function virtualization cloud.

FIG. 3 is a simplified system diagram of example components for self-healing in a Telco NFV cloud. Analytics engines 310 can detect events in the physical and virtual layers of the Telco cloud 300, such as a host being down at stage 305 or video service degradation at stage 310. In one example, a physical analytics engine 315, such as Service Assurance®, can perform causal analysis to detect physical problems in the physical layer. Meanwhile, a virtual analytics engine 320, such as vRealize® Operations ("vROPS") can monitor KPI information to detect software problems in the virtual layer.

The physical analytics engine 315 and virtual analytics engine 320 each can send alerts to an evaluator engine 330. The evaluator engine 330 can map problems in one layer to the other. In one example, the evaluator engine 330 makes cross-domain correlations between physical and virtual components to correlate KPI threshold alerts (also called VNF alerts) from the virtual analytics engine 320 to faults sent from the physical analytics engine 315. A mapping file can be created between objects from the two engines 315, 320. In some examples, the object translation can occur as part of the symptom injection, such as stage 210 of FIG. 2.

By combining KPI-based dynamic thresholds of the virtual analytics engine 320 with symptom-based code book correlation from the physical analytics engine 315, the evaluator engine 330 can generate a root cause analysis ("RCA") event 340. The RCA event 340 can be used to take remedial actions as defined in one or more action policy files. The RCA event 340 can be an object used by the evaluator engine 330 to look up potential remedial actions. In one example, the RCA event 340 can be generated based on models at the physical analytics engine 315. For example, a model can indicate a physical service router card contains ports, which contain interfaces, which contain virtual local area networks. Then performance-based alerts from the dynamic thresholding of the virtual analytics engine 320 can be correlated to the various model elements in the RCA event 340. The RCA event 340 can be generated at the physical analytics engine 315 or virtual analytics engine 320 based on injection from the other engine, in an example. For the purposes of this disclosure, the injection components can be considered part of the evaluator engine 330. Alternatively, the RCA event 340 can be generated separately by the evaluator engine 330 in a process running separately from the analytics engines 310.

The RCA event 340 can then be used by the self-healing component for remediation at stage 350. This can include comparing the correlated alerts of the RCA event 340 to one or more action policy files, such as the example in Table 1. The self-healing component can be an application that executes as part of the evaluation engine 330 in one example. The remedial actions can be for physical or virtual components in the Telco cloud 300, depending on the action type specified in the action policy file. These include virtual components such as VNFs, and physical components such as physical networking and storage devices, such as routers, switches, servers, and databases. In one example, the remediation can be applicable to any of a Telco cloud's 300 virtual overlay components or physical underlay components.

As an example, if a host is down at stage 305, this in turn can be an underlying reason that video service degradation is detected at stage 310. The remedial action could include sending a request (also called a command) from an action adaptor to a network configuration manager process that can perform managerial tasks on the host. Additionally, a request to an orchestrator from another action adaptor could cause the four VNFs hosted at the host to be instantiated elsewhere so that the video service can continue to operate. In another example, if video service degradation is detected at stage 310 but the host is not down, this can be a symptom of a problem with the host. By performing a remedial action on the host, the host may be prevented from going down.

Figure 4:
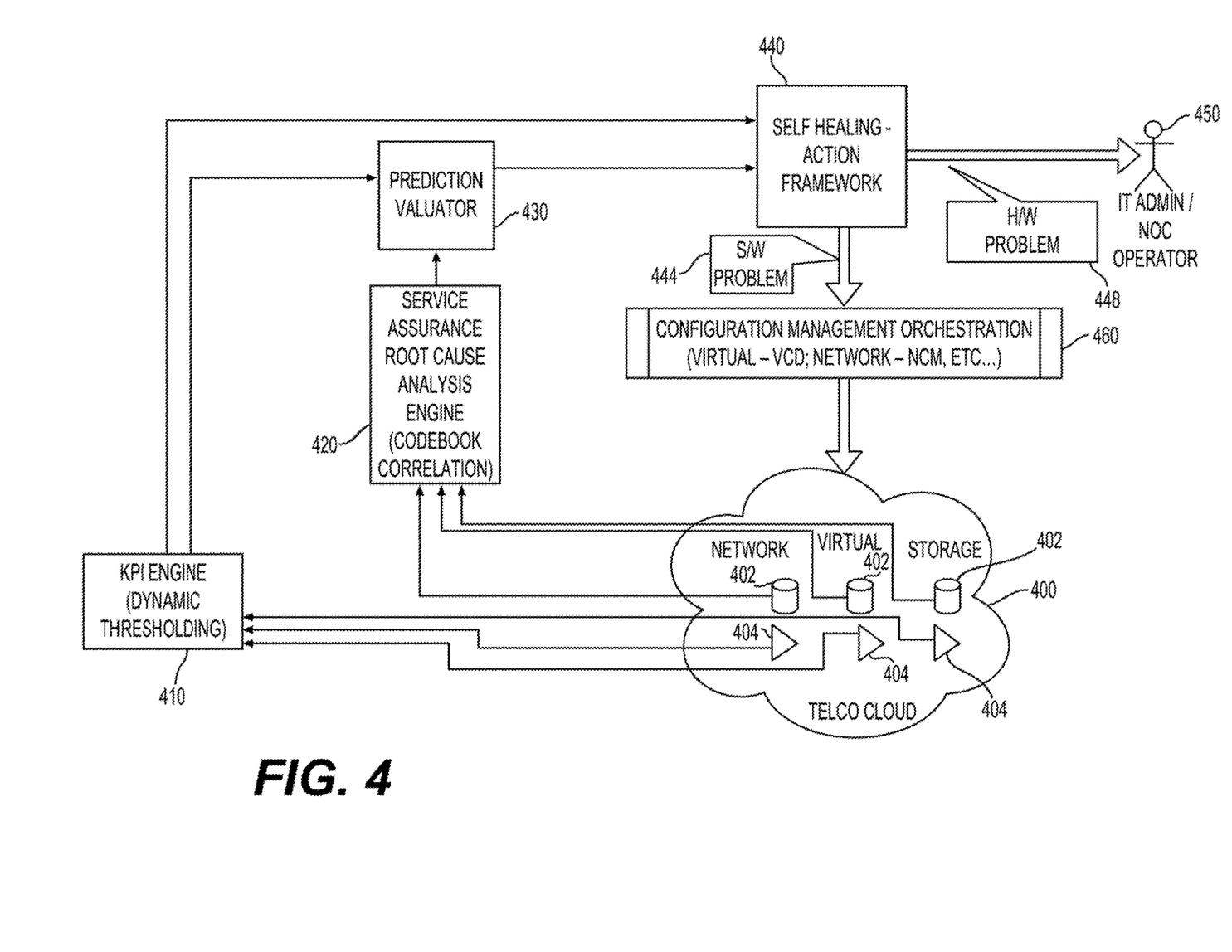
FIG. 4 is an example system diagram for self-healing of a Telco network function virtualization cloud at operator level.

FIG. 4 is another exemplary illustration of a system for self-healing in a Telco NFV cloud. A Telco cloud 400 can include various VNFs implemented on physical hardware devices 402. The VNFs can represent any software-defined network functions. In this example, networking VNFs, virtual datacenter VNFs, and storage-related VNFs can execute in the Telco cloud 400. The physical hardware devices 402 can be any computing devices, such as server cards, that include a processor and a non-transitory, computer-readable storage medium. The hardware devices 402 can be specific to networking, such as routers or switches, or can be hardware servers running VNFs for networking purposes.

The physical hardware devices 402 can execute applications that report various hardware properties to a physical analytics engine 420. The physical analytics engine 420 can run on the same hardware or different hardware than the physical hardware devices 402 of the Telco cloud. The physical analytics engine 420 can perform root cause analysis on the hardware properties. This can include utilizing codebook correlation to recognize potential faults based on the hardware properties. A recognized fault can be sent to a prediction valuator 430 portion of an evaluation engine.

The Telco cloud 400 can execute KPI interfaces 404 for gathering KPI metrics regarding the VNFs. Example KPI metrics include write latency, read latency, operations per second, packet drops, input packet rate, output packet rate, and others. The virtual analytics engine 410 can compare the KPI metrics gathered by the KPI interfaces 404 against thresholds. The thresholds can change dynamically based on service requirements, types of data, and other factors. If the threshold comparison indicates that a KPI metric is non-conforming or otherwise anomalous, the virtual analytics engine 410 can send an alert to the prediction valuator 430 portion of the evaluator engine.

The prediction valuator 430, like any of the engines discussed, can be an application running inside a virtual machine or directly on a physical server, in an example. The prediction valuator 430 can perform cross-layer mapping between the virtual and physical layers. This can allow the prediction valuator 430 to create an RCA event with a root cause by correlating information from both the virtual and physical analytics engines. For example, when multiple VNF alerts indicate that video service is degraded, the prediction valuator 430 can determine that all of these VNFs are running on the same physical host. The prediction valuator 430 can create an RCA event indicating the host is down and send the RCA event to the self-healing component 440 and associated action framework.

The prediction valuator 430 can correlate physical and virtual alerts to determine a root cause arising in the physical layer. For example, the Service Assurance® can detect a host is down based on simple network management protocol ("SNMP") polling. vRealize® can also generate KPI information for several metrics. For example, vRealize® can detect increased call drops for a 5G VNF, a high call ratio for an interval of time within an hour, and network utilization exceeding threshold capacity. This KPI information can be injected into Service Assurance® by use of the prediction valuator 430. This can allow the evaluator engine or Service Assurance® to correlate the host down event with the KPI information and create the combined RCA event.

The prediction valuator 430 can also correlate physical and virtual alerts to determine a root cause arising in the virtual layer. For example, vRealize® can detect a resource shortage based in part on information from Service Assurance®, such as an overconsumed virtual computer processing unit ("vCPU"), high memory usage, or storage capacity limits in the virtual layer related to 5G VNFs. Then, over the span of several minutes, vRealize® can detect a high congestion level, packet rejection, or other KPI metric. In response to both, vRealize® can generate alerts indicating a degraded video experience. The KPI information from these alerts can be injected into Service Assurance® by use of the prediction valuator 430. The prediction valuator 430 can correlate the KPI information to physical components and generate an RCA event based on both.

The prediction valuator 430 further can determine a root cause in the physical layer based on virtual layer alerts. For example, over a period of time (such as 5-10 minutes during the past hour), vRealize® can generate KPI information regarding packet loss. When the packet loss exceeds a threshold, a VNF alert can be injected into Service Assurance®. In turn, Service Assurance® (such as through the prediction valuator 430) can analyze the packet loss impact on an interface, card with the interface, and service router with the card. Service Assurance® can then inject a synthesized fault containing this physical hardware information back into vRealize®, which can send a root cause event to the self-healing component 440.

The self-healing component 440 can utilize the RCA event for remedial actions. The self-healing component 440 can be an application running in a VM or on a physical server. The self-healing component 440 can be part of an action framework that maps alerts to actions based on the action policy files. The action policy files can be XML files, JSON files, or other file types. The mapping can indicate whether a remedial action should be taken. In one example, alerts with object names or object IDs listed in the action policy file will warrant an action specified in the action policy file or in an action adaptor. Conversely, if the action policy file does not contain the object or object ID, no action will be taken in an example.

The remedial action can be carried out in either the physical or virtual layer. In one example, the remedial action can include invoking a previous stable configuration of virtual components (for example, VNFs) for a software problem 444. An action adaptor can send a request to an orchestrator 460, causing the orchestrator 460 to then reconfigure VNFs in the Telco cloud 400. The request can identify the VNFs that need to be moved, re-instantiated, or reconfigured.

The remedial action can also be performed on physical hardware when a hardware problem 448 is detected. For example, the self-healing component 440 can invoke a previous stable configuration of the impacted hardware. A process, such as a network configuration management tool operating with Service Assurance®, can download and activate the stable configuration on the hardware.

The remedial action can also include visually identifying the problem to an operator 450. In one example, if the self-healing component 440 identifies a hardware problem 448, it can send a notification for display in a GUI. For example, when the root cause is a host down event (resulting in KPI information failing outside of thresholds), the admin 450 can be visually notified. In one example, the GUI can be part of a console at one of the analytics engines.

The GUI can include a notification log that presents the root cause to the operator. For example, a problem arising in the physical layer, such as "host down" can be displayed as a root cause in the log. In one example, clicking the physical root cause can also show the various VNFs, network resources, and tenants (such as customers) impacted by the problem. In some examples, instructions can be available to guide the operator in manually fixing the problem. In other examples, the self-healing component can cause automated workflows to execute to fix some or all of the problem, such as launching new VMs on a new host.

The log can also provide information about, and selectable actions for, problems arising in the virtual layer. In one example, the displayed root cause can be a resource shortage in the physical or virtual layer. Clicking this root cause can allow the operator to see the network services and tenants impacted by the resource shortage. Performance notifications about degraded video experience related to the root cause can also be displayed, including KPI information related to the degraded video experience. Clicking on this information can launch performance reports related to the virtual components, such as VNFs, and launch remediation workflows in an orchestration platform.

Figure 5:
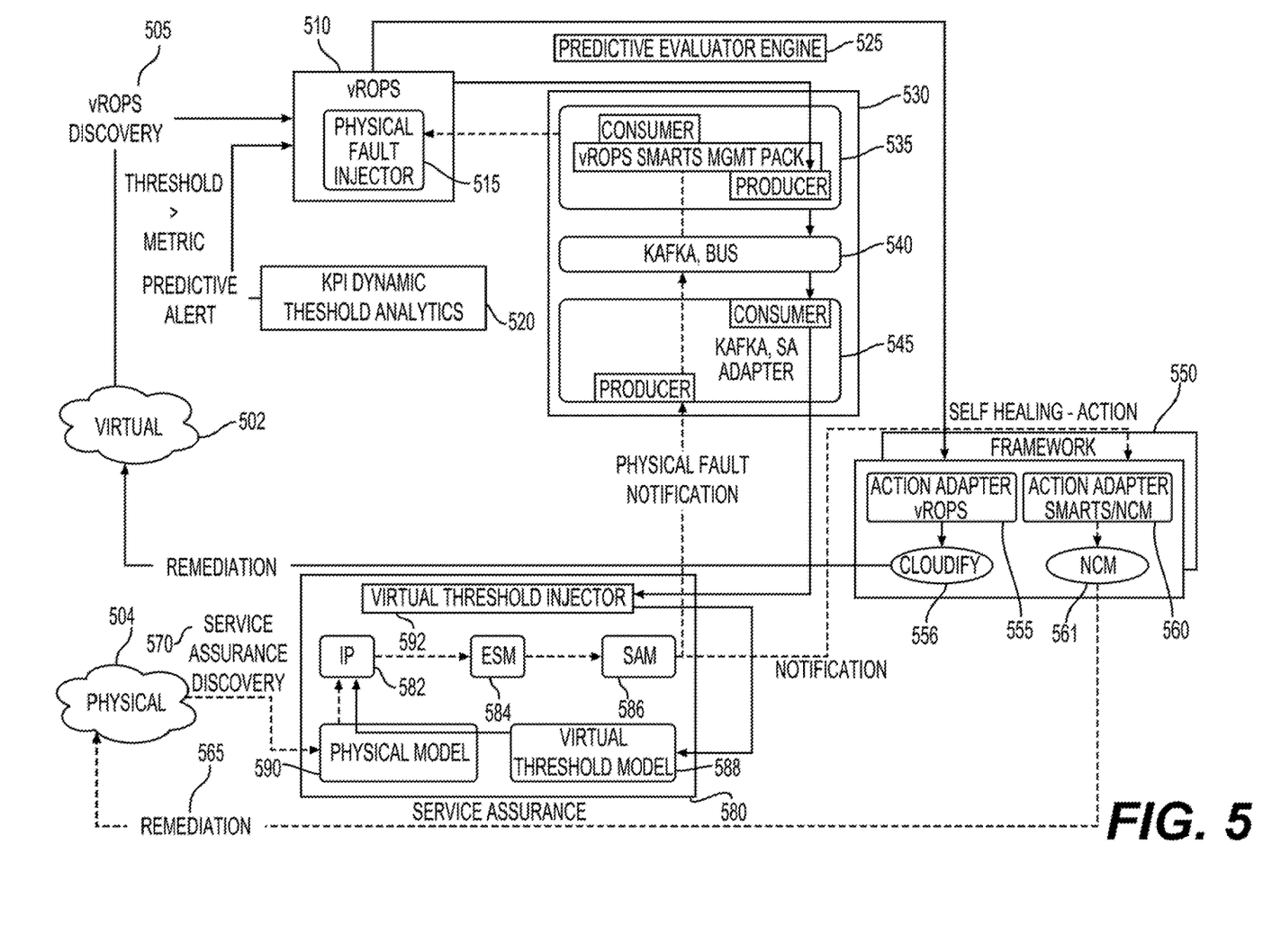
FIG. 5 is an example system architecture diagram including components and stages for self-healing of a Telco network function virtualization cloud.

FIG. 5 is another example system diagram illustrating cross-layer threshold injection between the virtual and physical layers. In this example, the distributed cloud network of the Telco datacenter is visually separated into a virtual layer 502 and physical layer 504. The virtual layer 502 includes virtual components, such as VNFs, that execute on physical hardware. The physical layer 504 includes that physical hardware, such as servers, switches, routers and other physical devices.

In the illustration of FIG. 5, solid arrows indicate actions involving a virtual analytics engine 510 and dashed arrows indicate actions involving a physical analytics engine 580. The virtual analytics engine 510, in this example vRealize® Operations, can discover 505 the virtual components, including virtual services running in various VMs within the virtual layer 502 and build relationships and dependencies between the services of the different VMs. The virtual analytics engine 510 can be one or more applications running on one or more physical servers having processors and non-transitory computer-readable mediums. These physical servers can be part of the physical layer 504 or separate from the Telco cloud.

The physical analytics engine 580, in this example Service Assurance®, can discover 570 the hardware devices in the physical layer 504 of the Telco cloud. The physical analytics engine 580 can build a physical model 590 that includes the discovered hardware. This can include information from certificates, names of devices, and device types, such as bridges and routers. The physical analytics engine 580 can execute a data exchange driver ("DXA") to correlate cross-domain managers between physical and virtual components. In one example, physical components are identified by IP agent 582, which can analyze layer 3 logical paths for transmitting between physical components of the Telco cloud network. The IP agent 582 can store identities of switches, routers, and other hardware using the layer 3 paths. An enterprise service manager 584 can recognize virtual components running on the identified hardware, such as by communicating with hypervisors running on bare metal of the hardware. For example, the enterprise service manager 584 can interface with VMware®'s ESX® to track virtual entities on the hardware. A service assurance manager 586 can provide alerts to an operator, such as through a console GUI.

An evaluator engine 525 can include logic for injecting KPI information from the virtual analytics engine 510 into the physical analytics engine 580. In one example, translation logic 530 can convert objects from the virtual analytics engine 510 into an object format for the physical analytics engine 580 and vice versa. For example, a first adaptor 535 can produce an object from the virtual analytics engine 510 on a bus 540 to a second adaptor 545. The bus can be an Apache® Kafka® bus in one example. The object can be a VNF alert containing KPI information. The second adaptor 545 can translate the KPI information into a format used by a virtual threshold injector 592 in the physical analytics engine 580. In one example, the translation logic 530 converts a vRealize® object into a Smarts object readable by Service Assurance®. A mapping file between vRealize® objects and Smarts domain objects can be used by the first or second adaptor 535, 454 to make the conversion.

The system can also perform cross-layer translation in the opposite direction. For example, the second adaptor 545 can produce a physical fault notification from the physical analytics along the bus 540 to the first adaptor 535. The first adaptor 535 can translate the physical fault notification into a format used by a physical fault injector 515 in the virtual analytics engine 510.

The cross-layer injection can allow each analyzer engine 510, 580 to consider information from the other as part of generating alerts (for example, an RCA event) for the self-healing component 550. For virtual-to-physical injection, the virtual threshold injector 592 can use the incoming KPI information as input attributes in a virtual threshold model 588. The virtual threshold model 588 can include a file or database, such as an XML or JSON file, that converts KPI attributes into attributes, and attribute combinations into problems. For example, packet drops and packet rate can be input as KPI attributes. The virtual threshold model can define symptoms that are based on these and other attributes. The presence of symptoms can be determined by comparing the KPI attributes to thresholds. For example, a first symptom can be defined as more than 70 packet drops occur in a period. A second symptom in the model 588 can be defined as an input packet rate of less than 50 during a period. Any number of symptoms can be defined by the virtual threshold model 588.

The virtual threshold model 588 can also define one or more problems based on combinations of symptoms. For example, a first problem can exist if either the packet drops symptom or input rate symptom return true. Different combinations of symptoms can indicate different problems, in an example.

When a problem is recognized, additional VM and hardware information can be attached to the KPI information at the root of the problem. This can include sending querying information from the virtual threshold injector 592 or virtual threshold model 588 to the IP agent 582 to discover hardware related to the virtual components reporting the KPI information. The IP agent 582 can use information from the physical model 590 and enterprise service manager 584 to make physical-to-virtual correlations. This can allow the physical analysis engine 580 to create an alert, such as an RCA event, that includes both the KPI information and the physical device information.

In one example, the RCA event can be presented in a GUI as an alert to an operator by the service assurance manager 586. In another example, the RCA event can be sent from the physical analytics engine 580 to the self-healing component 550. This can occur based on GUI input or automatically, in various examples.

The physical analytics engine 580 can also send physical fault notifications to the physical fault injector 515 at the virtual analytics engine 510. In one example, a consumer in the first adaptor 535 receives the physical fault notification and translates it into an object readable by the virtual analytics engine 510. For example, a Smarts Management Pack can be used to translate the physical fault notification into a Smarts object readable by vRealize®. The object can include physical-to-virtual mappings in one example that allow the virtual analytics engine 510 to associate KPI information and predictive alerts with the physical hardware. For example, using the virtual component information in the object, the virtual analytics engine 510 can query for associated KPI information. This can allow the virtual analytics engine 510 to output an RCA event to the self-healing component 550 based on the KPI dynamic thresholds.

The self-healing component 550 can be part of the evaluator engine 525 in an example and receive notifications (for example, RCA events) from both evaluator engines 510, 580. By applying a remedial action framework, the self-healing component 550 can perform a remedial action by sending a request for implementation in the physical or virtual layer 504, 502. The action framework can include one or more action adaptors 555, 560. The action adaptors can be invoked based on information in the notifications (for example, RCA events) correlating to actions in an action policy file. The number of different action adaptors 555, 560 can vary for different examples. In the illustrated example, a first action adaptor 555 is used for vRealize® remedial actions and a second action adaptor 560 is used for Service Assurance® remedial actions. Each action adaptor 555, 560 can have its own corresponding action policy file, in an example.

The first action adaptor 555 can be used for remedial actions in the virtual layer 502. The first action adaptor 555 can send a request to an orchestrator 556 for implementing the remedial action. One example orchestrator 556 is Cloudify®. In general, an orchestrator 556 can provide management functions in a virtual layer 502, such as implementing blueprints that specify which virtual components to instantiate and where to do so (for example, on which physical devices or at which cloud locations in the distributed network). The first action adaptor 555 can use an API of the orchestrator 556 to request particular remedial actions in one example.

The second action adaptor 560 can be used for remedial actions 565 in the physical layer 504. The second action adaptor 560 can send a request to a network configuration manager 561 for implementing the remedial action 565. For example, the network configuration manager 561 can restore a prior stable configuration in a hardware device to keep a port up and running. The second action adaptor 560 can be configured to communicate with various platforms capable of managing or load balancing hardware in the physical layer 504.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for network function virtualization self-healing, comprising:
    sending an alert from a virtual analytics engine to a physical analytics engine based on a key performance indicator ("KPI") threshold comparison for a virtual component of a distributed network;
    determining, at the physical analytics engine, that a problem with hardware exists based on comparing a virtual KPI attribute from the alert to a symptom threshold;
    correlating, by the physical analytics engine, the alert to a physical hardware device by mapping the virtual component associated with the alert to the physical hardware device; and
    sending a root cause analysis event used for remediating the problem, wherein the root cause analysis event includes information about the physical hardware device and virtual KPI attribute, and wherein remediating the problem includes at least one of:
        presenting a notification on a graphical user interface ("GUI"); and
        making a change to at least one of the virtual component and physical hardware device.

2. The method of claim 1, wherein the root cause analysis event is used to determine a remedial action in the distributed network by comparing information from the root cause analysis event to an action policy file, wherein an adaptor formats a request to perform the remedial action.

3. The method of claim 1, wherein the root cause analysis event is sent from the physical analytics engine and identifies a problem in the virtual layer.

4. The method of claim 1, further comprising:
    translating the alert from the virtual analytics engine into an object used by the physical analytics engine; and
    using the translated object to correlate the alert to the physical hardware device.

5. The method of claim 1, further comprising:
    sending a physical fault notification from the physical analytics engine to the virtual analytics engine;
    querying, by the virtual analytics engine, for KPI information based on the physical fault notification; and wherein the root cause analysis event is a synthesized alert based on the KPI information and physical fault notification.

6. The method of claim 5, wherein the virtual analytics engine sends the synthesized alert to a self-healing component, and wherein the self-healing component sends a command to perform a remedial action based on the synthesized alert.

7. The method of claim 6, wherein the synthesized alert from the virtual analytics engine causes the remedial action to take place in a physical layer of the distributed network.

8. A non-transitory, computer-readable medium comprising instructions that, when executed by a processor, perform stages for network function virtualization self-healing, the stages comprising:
   sending an alert from a virtual analytics engine to a physical analytics engine based on a key performance indicator ("KPI") threshold comparison for a virtual component of a distributed network;
   determining that a problem exists with hardware based on comparing a virtual KPI attribute from the alert to a symptom threshold;
   correlating, by the physical analytics engine, the alert to a physical hardware device by mapping the virtual component associated with the alert to the physical hardware device; and
   sending a root cause analysis event used for remediating the problem, wherein the root cause analysis event includes information about the physical hardware device and virtual KPI attribute, and wherein remediating the problem includes at least one of:
      presenting a notification on a graphical user interface ("GUI"); and
      making a change to at least one of the virtual component and physical hardware device.

9. The non-transitory, computer-readable medium of claim 8, wherein the root cause analysis event is used to determine a remedial action in the distributed network by comparing information from the root cause analysis event to an action policy.

10. The non-transitory, computer-readable medium of claim 8, wherein the root cause analysis event is sent from the physical analytics engine and identifies a problem in the virtual layer.

11. The non-transitory, computer-readable medium of claim 8, the stages further comprising:
   translating the alert into an object used by the physical analytics engine; and
   using the translated object to correlate the alert to the physical hardware device.

12. The non-transitory, computer-readable medium of claim 8, the stages further comprising:
   sending a physical fault notification from the physical analytics engine to the virtual analytics engine;
   querying, by the virtual analytics engine, for KPI information based on the physical fault notification; and
   wherein the root cause analysis event is a synthesized alert based on the KPI information and physical fault notification.

13. The non-transitory, computer-readable medium of claim 12, wherein the virtual analytics engine sends the synthesized alert to a self-healing component, and wherein the self-healing component sends a command to perform a remedial action based on the synthesized alert.

14. The non-transitory, computer-readable medium of claim 13, wherein the synthesized alert from the virtual analytics engine causes the remedial action to take place in a physical layer of the distributed network.

15. A system for performing self-healing in a distributed network, comprising:
   a non-transitory, computer-readable medium containing instructions; and
   at least one processor that executes the instructions to perform stages comprising:
      sending an alert from a virtual analytics engine to a physical analytics engine based on a key performance indicator ("KPI") threshold comparison for a virtual component of a distributed network;
      determining that a problem with hardware exists based on comparing a virtual KPI attribute from the alert to a symptom threshold;
      correlating, by the physical analytics engine, the alert to a physical hardware device by mapping the virtual component associated with the alert to the physical hardware device; and
      sending a root cause analysis event used for remediating the problem, wherein the root cause analysis event includes information about the physical hardware device and virtual KPI attribute, and wherein remediating the problem includes at least one of:
         presenting a notification on a graphical user interface ("GUI"); and
         making a change to at least one of the virtual component and physical hardware device.

16. The system of claim 15, wherein the root cause analysis event is used to determine a remedial action in the distributed network by comparing information from the root cause analysis event to an action policy file, and wherein an adaptor formats a request to perform the remedial action.

17. The system of claim 15, wherein the root cause analysis event is sent from the physical analytics engine and identifies a problem in the virtual layer.

18. The system of claim 15, the stages further comprising:
   translating the alert into an object used by the physical analytics engine; and
   using the translated object to correlate the alert to the physical hardware device.

19. The system of claim 15, the stages further comprising:
   sending a physical fault notification from the physical analytics engine to the virtual analytics engine;
   querying, by the virtual analytics engine, for KPI information based on the physical fault notification; and
   wherein the root cause analysis event is a synthesized alert based on the KPI information and physical fault notification.

20. The system of claim 19, wherein the virtual analytics engine sends the synthesized alert to a self-healing component, and wherein the self-healing component sends a command to perform a remedial action in a physical layer of the distributed network.

* * * * *